United States Patent [19]

Nusshör

[11] Patent Number: 5,786,049
[45] Date of Patent: Jul. 28, 1998

[54] COVER FOR A GAS BAG MODULE

[75] Inventor: Bernd Nusshör, Spraitbach, Germany

[73] Assignee: TRW Occupant Restraint Systems GmbH, Alfdorf, Germany

[21] Appl. No.: 503,553

[22] Filed: Jul. 18, 1995

[30] Foreign Application Priority Data

Jul. 25, 1994 [DE] Germany ............... 44 26 342.2

[51] Int. Cl.$^6$ ................ B60R 21/16; B32B 27/32
[52] U.S. Cl. ........... 428/35.2; 428/35.7; 428/217; 428/220; 428/516; 428/517; 428/519; 280/728.3; 280/728.1; 264/513
[58] Field of Search .................. 428/35.7, 43, 217, 428/516, 517, 519, 53.2, 35.5, 220; 280/728.3, 731, 732, 743.1, 743.2, 728.1; 264/513

[56] References Cited

U.S. PATENT DOCUMENTS

| | | | |
|---|---|---|---|
| 4,311,628 | 1/1982 | Abdou-Sabet et al. | 260/33.6 |
| 4,894,408 | 1/1990 | Hazelton et al. | 524/425 |
| 5,110,647 | 5/1992 | Sawada et al. | 280/728.3 |
| 5,157,081 | 10/1992 | Puydak et al. | |
| 5,158,322 | 10/1992 | Sun | 280/728.3 |
| 5,248,532 | 9/1993 | Sawada et al. | 280/728.3 |
| 5,280,946 | 1/1994 | Adams et al. | 280/726.3 |
| 5,335,935 | 8/1994 | Proos et al. | 280/728.3 |

FOREIGN PATENT DOCUMENTS

| | | |
|---|---|---|
| 0292201 | 11/1988 | European Pat. Off. . |
| 0604776 | 7/1994 | European Pat. Off. . |
| 2057458 | 4/1981 | United Kingdom . |
| 2254618 | 10/1992 | United Kingdom . |

OTHER PUBLICATIONS

Sperling, L. H., Introduction to Physical Polymer Science, p. 8, 14–17, and 303, 1986.

*Primary Examiner*—Rena L. Dye
*Attorney, Agent, or Firm*—Tarolli, Sundheim, Covell, Tummino & Szabo

[57] ABSTRACT

The cover for a gas bag module comprises as its main part two layers of a fully vulcanized polyolefinic material, which are formed into a composite structure. This material consists of fully cross-linked rubber particles, which are distributed in a continuous matrix of thermoplastic material. The first layer is relatively hard with a hardness of approximately 32 to 43 Shore D and is essentially responsible for providing the desired structural strength. The second layer is relatively soft with a hardness of approximately 45 to 80 Shore A and ensures a pleasant, soft feeling when touched. It bears a coating of a two-component urethane lacquer system having a high scratch and abrasion resistance.

16 Claims, 1 Drawing Sheet

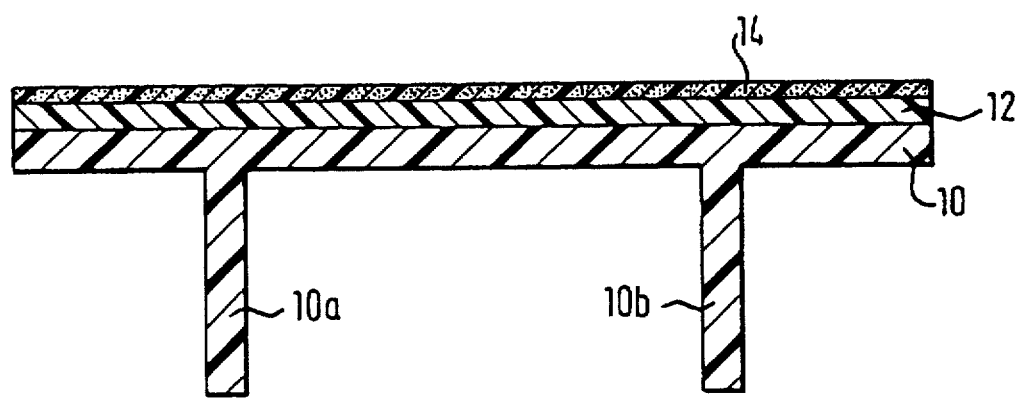

COVER FOR A GAS BAG MODULE

SUMMARY OF THE INVENTION

The invention relates to a cover for a gas bag module in a vehicle occupant restraining system.

Such a cover has to fulfill exacting mechanical requirements over a wide temperature range. As is known, such a cover must be able to split open at a rip seam for deployment of the gas bag and then fold back to allow outward movement during expansion. During such event no sharp fragments such as splinters should be produced. In order to enable the cover to be folded back, a high degree of flexibility is required. On the other hand a certain degree of structural stiffness is called so that the cover appears as an integral component for the dashboard (on the co-driver side) or, respectively, as a dimensionally stable integral cover of the steering wheel hub (on the driver side). These requirements have so far only been able to be met using composites, albeit without sufficient resistance to fracture at extremely low temperatures. Composite materials make the aim of later recycling hard to achieve.

The invention provides a cover for a gas bag module in a vehicle occupant restraining system, which while consisting of a plurality of components, has components based on the same basic material which together ensure a high degree of flexibility and structural strength over a wide temperature range of $-35°$ C. to $+85°$ C. In accordance with the invention the cover possesses as its main part a composite of two layers of a fully vulcanized polyolefinic material, which consists of fully cross-linked rubber particles distributed in a continuous matrix of thermoplastic material, the hardness of the first layer amounting to approximately 32 to 43 Shore D while hardness of the second layer amounts to approximately 45 to 80 Shore A.

Such fully cross-linked rubber particles may preferably a terpolymer of ethylene, propylene and dienes (EPDM). The thermoplastic material is preferably a polypropylene (PP).

The first layer of the gas bag cover essentially serves to provide for the necessary structural strength. The second layer, which is to the outside in use, is relatively soft and ensures that there is a pleasant, soft feel on touching it, which may be also termed a "softtouch" effect. This property may be still further enhanced by coating the second layer with a two-component urethane lacquer system, which consists of an adhesion promoter and a surface lacquer. This lacquer system furthermore improves the permanence of coloring and makes it fast to light while also enhancing resistance to scratching and producing a uniform color and luster effect.

The production of the gas bag cover is preferably performed by injection molding of the components for the first and for the second layer. This means that an intimate bond is produced owing to the nature of the materials, which in principle is the same. Such a method is furthermore suitable for a high productivity and contributes to lowering costs.

The thickness of the first layer may be 1 to 5 mm and that of the second layer 1 to 3 mm. Since even with a relatively low overall thickness a high structural stiffness is to be achieved, the weight is lower than with conventional covers.

Further advantageous developments and convenient forms of the invention will be understood from the following detailed descriptive disclosure of one particular embodiment whose single figure is a cross section taken through a gas bag cover.

DESCRIPTION OF THE DRAWINGS

This gas bag cover comprises as its main part a first layer 10 and a second, outside layer 12 of a somewhat lesser thickness. The two layers 10 and 12 each consist of a fully vulcanized material which consists of fully cross-linked rubber particles distributed in a continuous matrix of thermoplastic material. Both of the layers 10 and 12 are molded in a mold, inner side supports 10a and 10b being molded at the same time on the layer 10. Lastly the second layer 12 is provided with a coating 14 of a two-component urethane lacquer system, which consists of an adhesion promoter and a covering lacquer.

The production of the two rubber materials is performed in a dynamic vulcanizing method, which produces fully cross-linked rubber particles, which are distributed in a continuous matrix of the thermoplastic material. The rubber material is a terpolymer of ethylene, propylene and dienes (EPDM). The thermoplastic material is a polypropylene (PP).

More specifically, the rubber materials used in the present invention can be referred to as elastomer alloys and are obtained by blending of polymers which contain fractions of thermoplastic and elastomeric components. These polymers and the thermoplastic and elastomeric components, PP and EPDM, are thoroughly mixed, preferably adding a cross-linking agent. By proceeding in this way, various mixing ratios between the hard phase (PP) and the soft phase (EPDM) occur, the soft phase being fully cross-linked. The preferred blend contains small particles of elastomer uniformly and finely distributed in a thermoplastic matrix. The finer the distribution and the higher the degree of cross-linking of the elastomer particles, the better are the resiliency properties of the material produced.

In a process of dynamic vulcanizing the rubber particles are cross-linked in-situ during the mixing and dispersing. The specific properties of the blend, therefore, mainly depend on the proportion, the degree of cross-linking and the degree of dispersion of the rubber particles.

By using this technology of blending and dynamic vulcanizing, various combinations of physical properties can be achieved. Some physical properties can be virtually "tailored", such as the hardness or tensile strength. The physical and mechanical properties, the chemical stability and the integrity with respect to contacting agents, however, remain essentially determined by the properties of the individual components. By optimizing the blending parameters, the mixing quality and the degree of cross-linking, specific physical properties can be enhanced significantly.

The most significant physical properties of the two materials are listed in the following table.

TABLE

| Properties | Layer 1 | Layer 2 |
| --- | --- | --- |
| Density (DIN 53479) | 0.93–0.97 | 0.95–0.99 |
| Hardness (DIN 53505) | 32–43 Shore D | 45–80 Shore A |
| Tensile strength (ASTM D412) | 11–21 Mpa | 2–12 MPA |
| Elongation at tear (ASTM D412) | 470–700% | 200–600% |
| ACR Viscosity | 470–770 Poise | 120–680 Poise |

The lacquer system, of which the coating 14 consists, is a two-component urethane system constituted by an adhesion promoter and a covering lacquer. This lacquer system is characterized by excellent resistance to scratch and abrasion and in conjunction with the material, of which the second layer 12 is made, leads to a "softtouch" effect, the term employed in the art.

What is claimed is:

1. A cover for a gas bag module in a vehicle occupant restraining system, said cover having as a main constituent a composite of first and second layers bonded with each other, each of said layers being formed of a polyolefinic material which includes fully cross-linked rubber particles finely dispersed in a continuous matrix of thermoplastic material, said first layer having a hardness amounting to approximately 32 to 43 Shore D and said second layer having a hardness amounting to approximately 45 to 80 Shore A.

2. The cover as claimed in claim 1, wherein said rubber material is a terpolymer of ethylene, propylene and dienes.

3. The cover as claimed in claim 1, wherein said thermoplastic material is a polypropylene.

4. The cover as claimed in claim 3, wherein said rubber material is a terpolymer of ethylene, propylene and dienes.

5. The cover as claimed in claim 1, wherein said first layer has a thickness which amounts to approximately 1 to 5 mm.

6. The cover as claimed in claim 1, wherein said second layer has a thickness which amounts to approximately 1 to 3 mm.

7. The cover as claimed in claim 1, wherein said first and second layers are caused to form a composite by injection molding thereof.

8. The cover as claimed in claim 1, wherein said second layer is provided with a coating of a two-component urethane lacquer system, which includes an adhesion promoter and a covering lacquer.

9. The cover of claim 1, wherein said first and second layers are each formed of a material produced by thoroughly mixing a polypropylene with a terpolymer of ethylene, propylene and dienes to obtain a polymer blend containing small particles of substantially fully cross-linked rubber particles uniformly and finely dispersed in a thermoplastic matrix.

10. The cover of claim 9, wherein a cross-linking agent is added to the mixture of polypropylene and terpolymer of ethylene, propylene and dienes.

11. A cover for a gas bag module in a vehicle occupant restraining system, said cover having as a main constituent a composite of first and second layers bonded with each other, each of said layers being formed of a polyolefinic material consisting of fully cross-linked rubber particles finely dispersed in a continuous matrix of thermoplastic material, said first layer having a hardness amounting to approximately 32 to 43 Shore D and said second layer having a hardness amounting to approximately 45 to 80 Shore A.

12. The cover as claimed in claim 11, wherein said rubber material is a terpolymer of ethylene, propylene and dienes.

13. The cover as claimed in claim 11, wherein said thermoplastic material is a polypropylene.

14. The cover as claimed in claim 13, wherein said rubber material is a terpolymer of ethylene, propylene and dienes.

15. The cover as claimed in claim 11, wherein said first layer has a thickness which amounts to approximately 1 to 5 mm and said second layer has a thickness which amounts to approximately 1 to 3 mm.

16. A cover for a gas bag module in a vehicle occupant protection system, said cover including a composite of first and second layers bonded with each other, each of said layers consisting essentially of fully cross-linked rubber EPDM particle finely dispersed in a continuous matrix of polypropylene, said first layer having a hardness of about 32 to 43 shore D and said second layer having a hardness of about 45 to 80 shore A.

* * * * *